(12) United States Patent
Oohashi et al.

(10) Patent No.: US 6,476,535 B1
(45) Date of Patent: Nov. 5, 2002

(54) A.C. GENERATOR FOR VEHICLE

(75) Inventors: Atsushi Oohashi, Tokyo (JP);
Yoshihito Asao, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/947,436

(22) Filed: Sep. 7, 2001

(30) Foreign Application Priority Data

May 29, 2001 (JP) ........................................ 2001-160715

(51) Int. Cl.[7] .............................. H02K 5/24; H02K 1/22; H02K 19/22
(52) U.S. Cl. .......................................... 310/263; 310/51
(58) Field of Search ................................ 310/263, 261, 310/51, 58, 60 R, 61–63, 60 A, 254, 42, 201, 208; 29/596–598

(56) References Cited

U.S. PATENT DOCUMENTS

| | | | | |
|---|---|---|---|---|
| 3,714,484 A | * | 1/1973 | Habert | ........................ 310/263 |
| 4,201,930 A | * | 5/1980 | Inagaki et al. | ................. 310/51 |
| 4,972,114 A | * | 11/1990 | Frister | ......................... 310/263 |
| 5,270,605 A | | 12/1993 | Lefrancois et al. | ......... 310/263 |
| 5,708,318 A | * | 1/1998 | Fudono | ....................... 310/263 |
| 6,114,793 A | * | 9/2000 | Asao et al. | .................. 310/263 |
| 6,291,921 B1 | * | 9/2001 | Asao | ........................... 310/263 |

FOREIGN PATENT DOCUMENTS

JP  5-161286  6/1993  ................. 310/263

* cited by examiner

Primary Examiner—Tran Nguyen
(74) Attorney, Agent, or Firm—Sughrue Mion, PLLC

(57) ABSTRACT

A chamfered portion 100 on three points, being a point B formed on a peripheral end surface of a root shoulder portion of magnetic pole pieces 8a or 9a and being on a line, from which a taper formed on an outer peripheral surface of the root shoulder portion starts, a point C on a skew slanted portion of the magnetic pole pieces 8a and 9a, and a point A on the peripheral end surface of the magnetic pole pieces 8a or 9a apart from an end surface of a stator core 4 by a distance between L1/4 and 7×L1/8, is formed in the magnetic pole piece of an a.c. generator for vehicle, whereby noises such as wind noise and electromagnetic sound can be reduced, a magnetic circuit of a rotor is improved, the amount of magnetic flux is increased, whereby an output becomes high.

19 Claims, 12 Drawing Sheets

A.C. GENERATOR FOR VEHICLE

BACKGROUND OF THE INVENTION

1. Field of the Invention

The present invention relates to an a.c. generator for vehicle, which is driven by an internal combustion engine of a vehicle.

2. Discussion of Background

When an a.c. generator for vehicle is run, in order to ensure best function, it is necessary to cool an entire generator to be in a certain limit temperature or less. As a method of cooling, a fan is fixed to a disk of a magnetic pole wheel of a rotor and arranged inside a casing so as to be opposite to a winding wire of a stator to dissipate a sufficient heat quantity. Accordingly, a degree of cooling is improved, and an output from the a.c. generator can be increased. However, there is a problem that a large wind noise is generated by a turbulent flow of an air inside the casing. In order to solve this problem, the following has been proposed in a conventional technique.

FIG. 14 illustrates a cross-sectional view of a conventional a.c. generator for a vehicle disclosed in, for example, Japanese Unexamined Patent Publication JP-A-5-161286. FIG. 15 is a perspective view of a magnetic pole wheel of a rotor of the a.c. generator illustrated in FIG. 14. FIG. 16 illustrates an end surface of the magnetic pole wheel illustrated in FIG. 15 viewed in a direction of an arrow F in FIG. 14. FIG. 17 is a cross-sectional view taken along a line I—I illustrated in FIG. 16. FIG. 18 is an enlarged view of one of teeth of the magnetic pole wheel.

The a.c. generator has a stator assembly having stator core 4, formed by laminating metallic thin plates and having a plurality of grooves accommodating stator winding wires 5. The stator assembly is retained between a front bracket 1 and a rear bracket 2, which are mutually joined by bolts.

A rotor assembly, including two claw-type magnetic pole wheels 8 and 9, is mounted on a rotational shaft 7, wherein a central rotor core (not shown) having induction winding wires is retained between the magnetic pole wheels 8 and 9. The rotor assembly is engaged with, for example, a spline (not shown) formed in the rotational shaft 7 so as to rotate along with the rotational shaft 7.

Ends of the induction winding wires are connected to hollow connectors 26 and 27. The connectors 26 and 27 are respectively connected to corresponding one of two slip rings 14, respectively being in contact with corresponding one of two brushes 15 through the rotational shaft 7.

On back surfaces of the magnetic pole wheels 8 and 9, cooling fins 11 and 12 are respectively fixed. The magnetic pole wheels 8 and 9 respectively have a disk 50 in perpendicular to an axis line of the rotational shaft 7. In central portions of the disks 50, a concentric through-hole 51 for inserting the rotational shaft 7 is formed. On outer peripheral edges of the disks 50, six magnetic pole teeth 52 are monolithically formed. The teeth 52 are arranged with equal intervals, which are inwardly directed toward the other magnetic pole wheel and substantially in parallel with the axis line of the rotational shaft.

The teeth 52 of the magnetic pole wheel 8 are shifted by 30° in their peripheral direction with respect to the teeth 52 of the magnetic pole wheel 9. The teeth of the magnetic pole wheels are mutually inserted between the opposite teeth. As illustrated in FIG. 15, the magnetic pole wheels are shaped like angular magnetic pole crowns having opened ends. Polarities of the magnetic pole teeth 52 of the magnetic pole wheel 8 and of the magnetic pole teeth 52 of the magnetic pole wheel 9 are mutually adverse, wherein consecutive magnetic pole openings, having polarities adverse to those of grooves of the stator of the a.c. generator, are formed.

As illustrated in FIGS. 15 through 18, the magnetic pole teeth are shaped like a trapezium when viewed in a direction of the stator. Wide base portions of the teeth are joined to the disks 50 of the magnetic pole wheels. In more detail, the teeth 52 are formed by a cylindrical outer surface 54, chamfered portions 57 and 59, and two types of side surfaces 56 and 58, joined to the outer surfaces 54.

In directions perpendicular to the disks 50, the side surfaces 56 and 58 are in parallel with axis of symmetry X—X of the teeth 52. In regions apart from the disks 50, the side surfaces 56 and 58 are slanted so as to symmetrically converge into the axis X—X, and joined via the end surface 60, forming an end portion of the teeth 52 and being in perpendicular to the axis X—X. The outer surface 54 is joined to the back surface 62 of the disk 50 via a slant surface 64.

The teeth 52 respectively have at least one chamfered portion 66, functioning to prevent a noise. The chamfered portion is adjacent to the outer surface 54, and the side surfaces 56 or 58 on one side, and is adjacent to the surface 64 and surface 62. The chamfered portions 66 for preventing noise are slanted by angles respectively different from degrees of slant of the adjacent surfaces.

However, in the conventional a.c. generator for vehicle, there is a problem that an output is decreased because the chamfered portions 66 are too large. FIG. 19 is a cross-sectional view of a part of the conventional a.c. generator for vehicle, wherein a flow of a magnetic flux is shown. As designated by an arrow in FIG. 19, the flow of the magnetic flux Φ forms a loop from the magnetic pole wheel 8 of the rotor, the stator core 4, again the rotor, and the magnetic pole wheel 9 of the rotor, to the magnetic pole wheel 8. If the chamfered portion 66 of the magnetic pole wheel 8 or 9 is increased, the length l of a shoulder portion of the magnetic pole wheel 8, through which the magnetic flux Φ passes, is shortened. Accordingly, a cross-sectional area of the magnetic pole wheel 8 is reduced, therefore the magnetic flux Φ can not sufficiently pass, whereby there are problems that a property of the magnetic circuit is deteriorated, and an output is reduced.

SUMMARY OF THE INVENTION

It is an object of the present invention to solve the above-mentioned problems inherent in the conventional technique and to provide an a.c. generator for vehicle, which can reduce noises such as a wind noise and an electromagnetic noise, and can improve a magnetic circuit of a rotor so as to increase a magnetic flux to obtain a high output.

According to a first aspect of the present invention, there is provided an a.c. generator for a vehicle comprising:

a stator core having a stator coil;

a first rotor core, fixed to a rotational shaft inside an inner diameter of the stator core;

a second rotor core, fixed to the rotational shaft inside the inner diameter of the stator core;

a field magnetic coil for magnetizing the first rotor core and the second rotor core; and a plurality of first magnetic pole pieces and a plurality of second magnetic pole pieces, which are located in an axis direction of the rotational shaft respectively from the first rotor core and the second rotor core so as to mutually engage with a predetermined gap and to be opposite to the inner diameter of the stator core with a predetermined gap, wherein at least the first magnetic pole pieces or the second magnetic pole pieces has chamfered portions, formed by a surface on three points, being a point on a most outer periphery of a root shoulder portion and on a taper continuing from the most outer periphery toward an outer side of the generator in the axis direction to an end surface of the stator core, a point on a skew slanted portion of the magnetic pole piece, and a point on a surface of the magnetic pole piece apart from the end surface of the stator core by a distance between L1/4 and 7×L1/8 in the axis direction, where L1 is a distance between a root end surface of the magnetic pole piece and the end surface of the stator core.

According to a second aspect of the present invention, there is provided the a.c. generator for vehicle according to the first aspect of the present invention, wherein the chamfered portions are formed on both of the first and second magnetic pole pieces.

According to a third aspect of the present invention, there is provided the a.c. generator for vehicle according to the preceding aspects of the invention, wherein the chamfered portions are formed on the peripheral end surfaces on both sides of the root shoulder portion.

According to a fourth aspect of the present invention, there is provided the a.c. generator for vehicle according to the preceding aspects, wherein the point on the skew slanted portion of the magnetic pole piece is positioned where tip ends of teeth of the stator core are overlapped in radial directions.

According to a fifth aspect of the present invention, there is provided the a.c. generator for vehicle according to the preceding aspects, wherein the distance between the end surface of the stator core and the point on the skew slanted portion of the magnetic pole piece is a distance between the end surface of the stator core and a cross point between the tip end of the teeth of the stator core and the skew slanted portion of the magnetic pole piece or less.

According to a sixth aspect of the present invention, there is provided the a.c. generator for vehicle according to the preceding aspects, wherein a distance between two of the points on the taper of the root shoulder portions and also on two of the chamfered portions is a half of a width of the magnetic pole piece in the peripheral directions or less.

According to a seventh aspect of the present invention, there is provided the a.c. generator for vehicle according to the preceding aspects, wherein the number of the slots of the stator core is two by each pole and each phase.

According to an eighth aspect of the present invention, there is provided the a.c. generator for vehicle according to the preceding aspects of the invention, wherein the chamfered portion is formed by a curved surface.

According to a ninth aspect of the present invention, there is provided the a.c. generator for vehicle according to the preceding aspects of the invention, wherein the chamfered portions and surfaces adjacent thereto are joined so as to form a rounded shape.

According to a tenth aspect of the present invention, there is provided the a.c. generator for vehicle according to the preceding aspects of the invention, wherein the point on the taper in the root shoulder portion of the magnetic pole piece is substantially aligned in the axis direction with the end surface of the stator core.

According to an eleventh aspect of the present invention, there is provided the a.c. generator for vehicle according to the preceding aspects of the invention, wherein widths of adjacent teeth of the stator core are different each other.

According to a twelfth aspect of the present invention, there is provided the a.c. generator for vehicle according to the preceding aspects of the invention, wherein an annular fan is located on at least one of end surfaces of the first rotor core and the second rotor core, and an outer diameter of the fan is smaller than that of the first rotor core or the second rotor core.

According to a thirteenth aspect of the present invention, there is provided the a.c. generator for vehicle according to the preceding aspects of the invention, wherein the stator coil has a coil end outwardly extending from the end surface of the stator core, and a shielding plate is located thereto to shield at least an inner peripheral surface of the coil end.

According to a fourteenth aspect of the present invention, there is provided the a.c. generator for vehicle according to the preceding aspects, wherein the stator coil has a coil end outwardly extending from the end surface of the stator core, and the coil end is arranged by aligning the stator coil in peripheral directions.

BRIEF DESCRIPTION OF THE DRAWINGS

A more complete appreciation of the invention and many of the attendant advantages thereof will be readily obtained as the same becomes better understood by reference to the following detailed description when considered in connection with the accompanied drawings, wherein.

DETAILED DESCRIPTION OF THE PREFERRED EMBODIMENTS

A detailed explanation will be given of preferred embodiments of the present invention in reference to FIGS. 1 through 13 as follows, wherein the same numerical references are used for the same or similar portions and descriptions of these portions is omitted.

Embodiment 1

Figure 1:
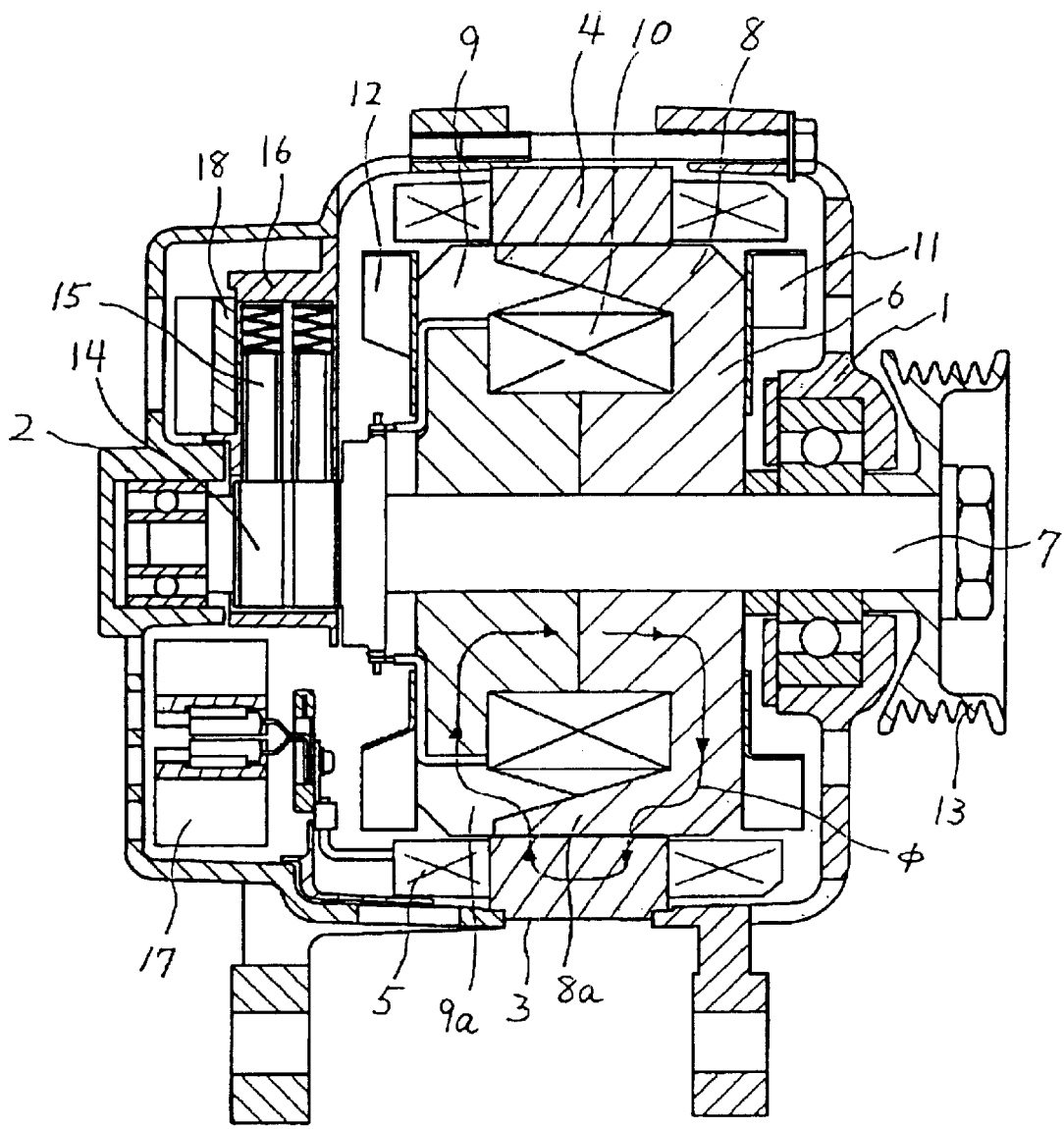
FIG. 1 is a cross-sectional view illustrating an a.c. generator for vehicle according to Embodiment 1 of the present invention.
Figure 2:
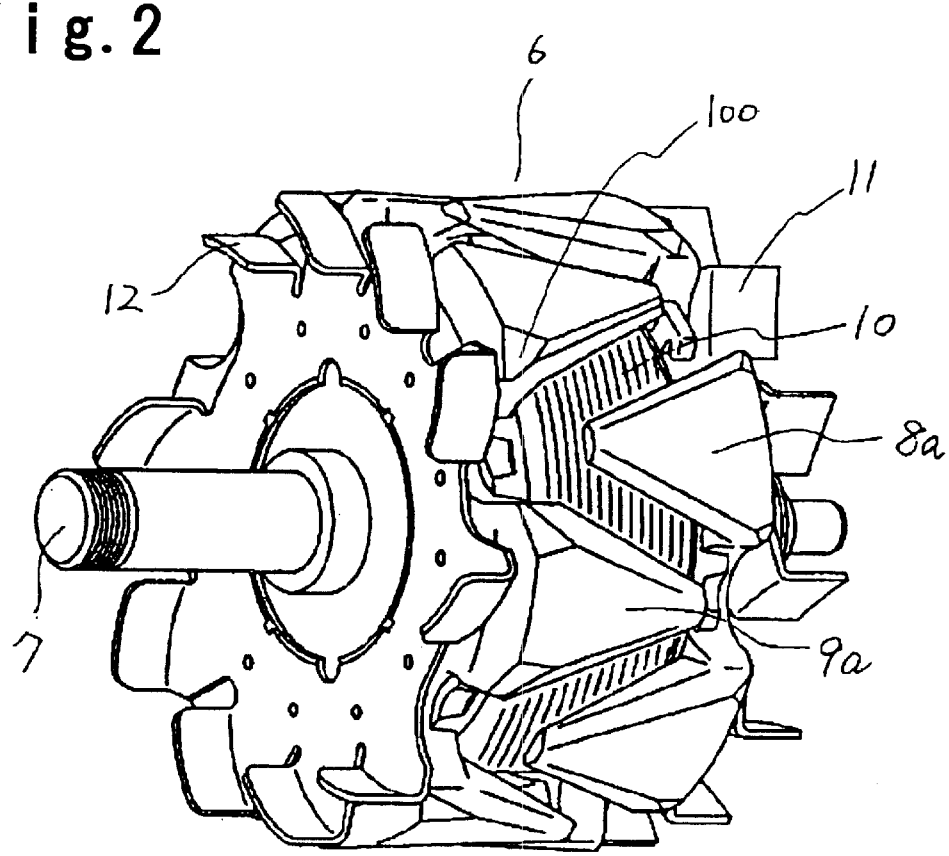
FIG. 2 is a perspective view illustrating a rotor of the a.c. generator for vehicle according to Embodiment 1 of the present invention.

FIG. 1 is a cross-sectional view of an a.c. generator for vehicle according to Embodiment 1 of the present invention. FIG. 2 is a perspective view of a rotor of the a.c. generator for vehicle illustrated in FIG. 1. In the figures, numerical reference 1 designates a front bracket, numerical reference 2 designates a rear bracket, numerical reference 3 designates a stator, interposed between the front bracket 1 and the rear bracket 2, which is formed by a stator core 4 and a stator coil 5, wound around the stator core 4 inside slots.

Numerical reference 6 designates a rotor fixed to a rotational shaft 7, supported by the front bracket 1 and the rear bracket 2 on both ends. The rotor is fabricated by a first rotor core 8, a second rotor core 9, a field magnetic coil 10 wound between the rotor cores 8 and 9, fans 11 and 12 formed on back surfaces of the first rotor core 8 and the second rotor core 9, a pulley 13 located in the rotational shaft 7 outside the front bracket 1, and a slip ring 14 located in the rotational shaft 7 inside the rear bracket 2 so as to supply an electric current to the field magnetic coil 10.

Numerical reference 15 designates a brush for supplying an electric current to the slip ring 14. Numerical reference 16 designates a brush holder for holding the brush 15. Numerical reference 17 designates a rectifier for rectifying a d.c. output from the stator coil 5. Numerical reference 18 designates a regulator for controlling an output voltage from the stator coil 5 by adjusting an electric current of the field magnetic coil 10.

A plurality of magnetic pole pieces 8a and a plurality of magnetic pole pieces 9a, both substantially shaped like a ladder are formed respectively in the first rotor core 8 and the second rotor core 9 at portions opposite to an inner peripheral surface of the stator core 4, wherein the magnetic pole pieces have a skew slanted portion, of which width in a rotational direction is narrowed toward a tip end and is shaped like a taper from a root shoulder portion to an end surface. These magnetic pole pieces 8a and 9a are arranged so as to mutually engage with predetermined gaps and alternately magnetized so as to be an n-pole and an s-pole.

In thus constructed a.c. generator for vehicle, an electricity is applied to the field magnetic coil 10 from a battery (not shown), mounted on a vehicle, through the brush 15 and the slip ring 14. When the rotor 6 is driven by an internal combustion engine through the pulley 13, the rotor 6 generates a rotational magnetic field, and a voltage is generated and rectified by the rectifier 17. The voltage is applied to a load (not shown).

Figure 3:
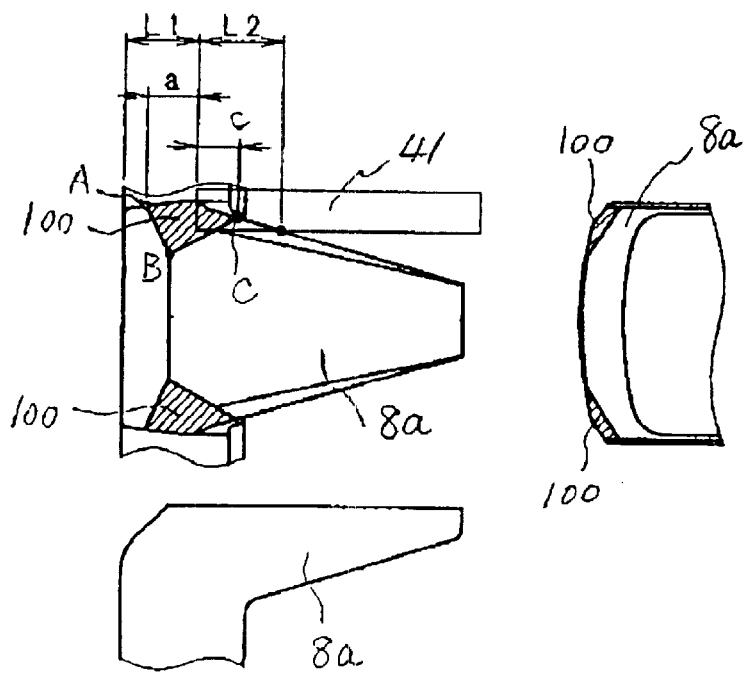
FIG. 3 illustrates a part of a magnetic pole piece of the rotor of the a.c. generator for vehicle according to Embodiment 1 of the present invention.

In this embodiment, a chamfered portion 100 described below is formed in the magnetic pole pieces Ba and 9a of the rotor 6. FIG. 3 illustrates an upper surface of the rotor in FIG. 2 for showing the magnetic pole piece 8a of the rotor. Hereinbelow, the magnetic pole piece 8a will be described. However, the magnetic pole piece 9a is the same type as the magnetic pole piece 8a, and the description is similarly applicable to the magnetic pole piece 9a.

As illustrated in FIG. 3, the chamfered portion 100 is formed by a surface on three points, being a point B on a line, from which the taper, formed on an outer peripheral surface of the root shoulder portion of the magnetic pole piece 8a, starts, a point C on the skew slanted portion of the magnetic pole piece 8a, and a point A on a peripheral end surface of the magnetic pole piece 8a apart from an end surface of the stator core 4 by a distance a being L1/4 through 7×L1/8, where L1 is a distance between the end surface of the magnetic pole piece 8a on a root side and the end surface of the stator core 4 (only a tip end portion of a teeth 41 is shown in FIG. 3).

Figure 4:
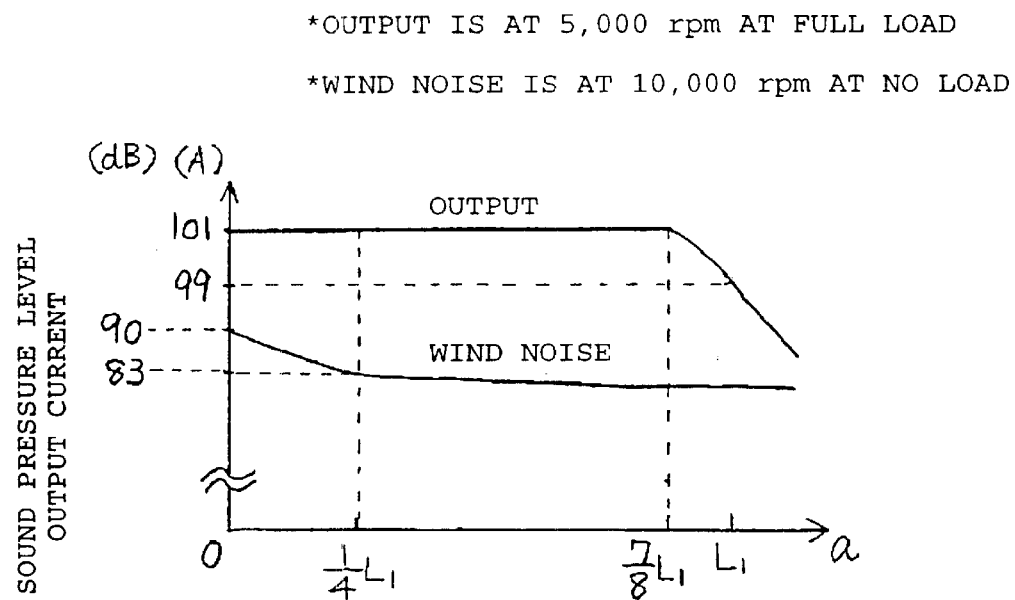
FIG. 4 illustrates characteristics of the a.c. generator for vehicle according to Embodiment 1 of the present invention.

FIG. 4 is a graph for explaining characteristics that the chamfered portion 100 effects on an output and a wind noise of the generator. In the FIG. 4, an ordinate represents a sound pressure level (dB) of the wind noise and an output current (A) from the generator; and an abscissa represents the above-described distance a. As for the output, data at full load of 5,000 rpm are shown, and as for the wind noise, data at no load 10,000 rpm are shown. As illustrated, the wind noise is 90 dB when the distance a is L1/4 or less. However, when the distance a becomes L1/4 or less, the wind noise is decreased to 83 dB, being a substantially constant sound pressure level. On the other hand, when the distance a is less than 7×L1/8, the output is about 101A, being substantially constant. However, when the distance a is larger than 7×L1/8, the output abruptly decreases. In other words, although the wind noise can be effectively decreased when the chamfered portion 100 is large, when the chamfered portion 100 is excessively enlarged, a cross-sectional area of the root shoulder portion of the magnetic pole wheel 8, through which a magnetic flux Φ passes, is reduced to deteriorate the output, as previously described in the problems to be solved.

Therefore, in this embodiment, the chamfered portion 100 is formed by determining the point A such that the distance a is between L1/4 through 7×L1/8, whereby the wind noise and the output become most suitable. Accordingly, it is possible to obtain effects that the magnetic circuit of the rotor 6 is improved and the output is high while keeping the effect of reducing the wind noise.

Although, in Embodiment 1, an example that the chamfered portion 100 is formed on the magnetic pole piece 8a of the first rotor core 8 and the magnetic pole piece 9a of the second rotor core 9 is described, an effect similar thereto is obtainable by forming the chamfered portion 100 on ones of the magnetic pole pieces 8a of the first rotor core 8 and the magnetic pole pieces 9a of the second rotor core 9.

Although, in Embodiment 1, an example that the chamfered portion 100 is formed on the peripheral end surface on both sides of the magnetic pole piece 8a is described, an effect similar thereto is obtainable by forming the chamfered portion 100 on one of the sides.

Embodiment 2

Figure 5:
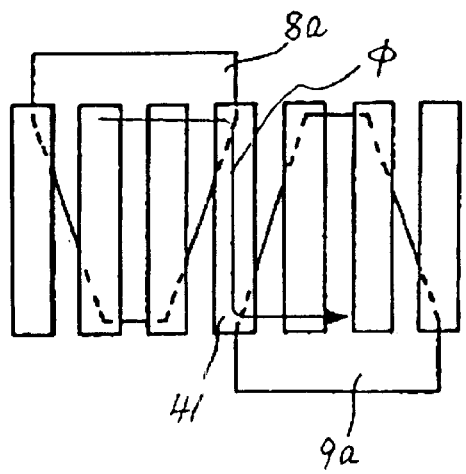
FIG. 5 illustrates magnetic pole pieces of a rotor of an a.c. generator for vehicle according to Embodiment 2 of the present invention for explaining a magnetic flux leaking from the magnetic pole pieces.

In Embodiment 2, a position of the point C on the skew slanted portion of the magnetic pole piece 8a described in Embodiment 1 will be described in detail. The point C is preferably at a position where a tip end of the teeth 41 of the stator core 4 is overlapped with the magnetic pole piece in a radial direction. FIG. 5 illustrates a magnetic flux leaking from the magnetic pole piece 8a of the rotor 6. As illustrated in the figure, in a case that the magnetic pole piece 8a is overlapped with the tip end of the teeth 41 in the radial direction, a magnetic flux Φ leaking from the magnetic pole piece 8a through the teeth 41 to the magnetic pole piece 9a exists. The leakage occurs because the magnetic pole piece 8a is opposed to the tip end of the teeth 41 in the radial direction with a minute gap. However, in Embodiment 2, since the tip end of the teeth 41 is overlapped with the chamfered portion 100 of the magnetic pole piece 8a, a distance between the magnetic pole piece 8a and the teeth 41 at the overlapping portion is increased by forming the chamfered portion 100, whereby it is possible to reduce magnetic flux leakage.

Figure 6:
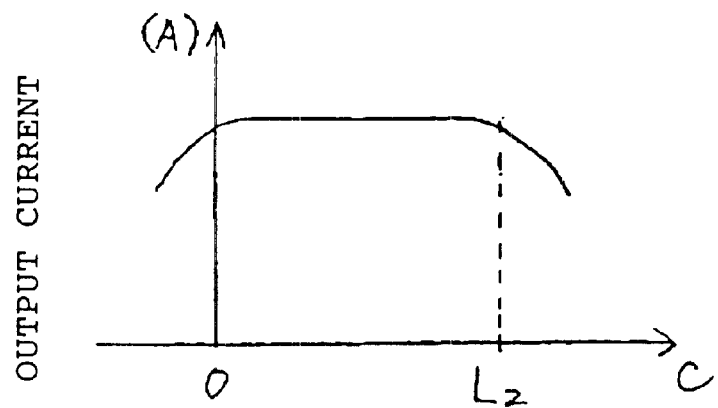
FIG. 6 illustrates a characteristic of the a.c. generator for vehicle according to Embodiment 2 of the present invention.

Further, in FIG. 3, it is preferable to render an overlap between the magnetic pole piece 8a and the chamfered portion 100 a distance L2 between the end surface of the stator core 4 and an intersecting point between the side surface of the teeth 41 and the skew slanted portion of the magnetic pole piece 8a. FIG. 6 is a graph showing a characteristic that the overlap c effects on the output from the generator. In FIG. 6, an ordinate represents an output current (A) from the generator, and the abscissa represents the distance c. As illustrated in FIG. 6, when the overlap between the magnetic pole piece 8a and the teeth 41 is 0 or less, magnetic flux leakage is increased, and when the overlap is L2 or more, the output is reduced because the cross-sectional area, through which the magnetic flux Φ passes, is reduced.

Embodiment 3

Figure 7:
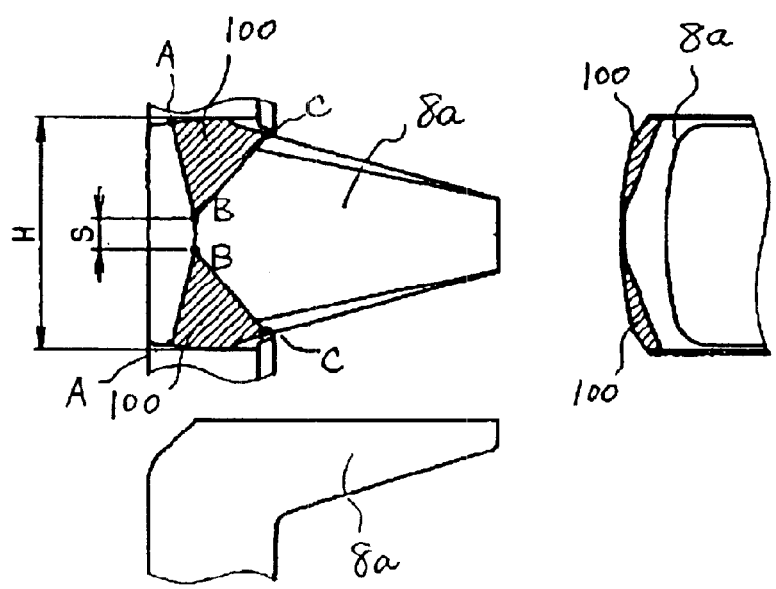
FIG. 7 illustrates a part of a magnetic pole piece of a rotor of an a.c. generator for vehicle according to Embodiment 3 of the present invention.

FIG. 7 is an enlarged view of a part of a magnetic is pole piece of a rotor 6 of an a.c. generator for vehicle according to Embodiment 3 of the present invention. In Embodiment 3, as illustrated in FIG. 7, a distance S between two points B on a line, from which a taper in a root shoulder portion starts, and being adjacent to two chamfered portions 100 formed on the magnetic pole piece 8a, is substantially a half of a width H of the magnetic pole piece 8a in peripheral directions or less.

Figure 8:
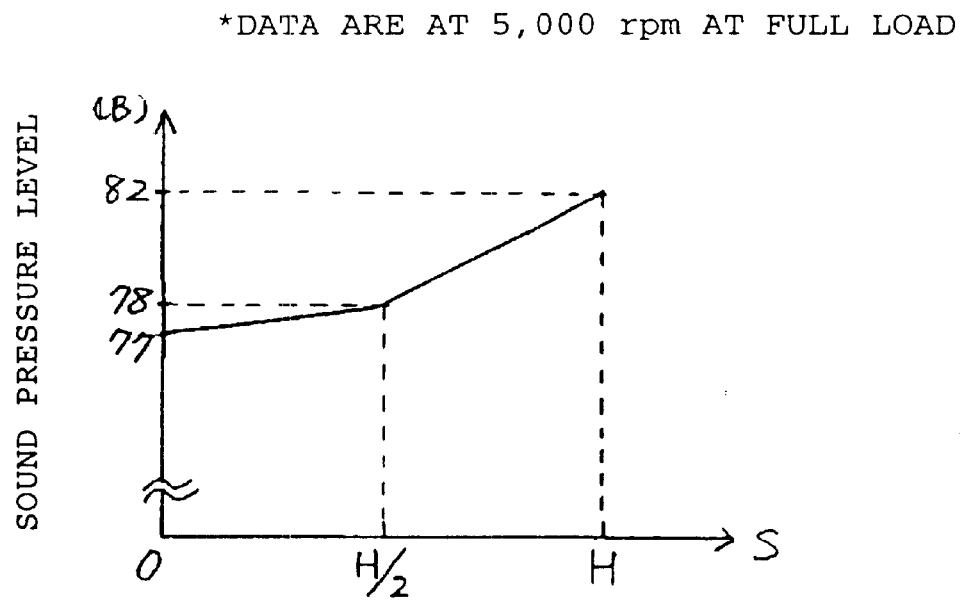
FIG. 8 illustrates a characteristic of the a.c. generator for vehicle according to Embodiment 3 of the present invention.

FIG. 8 is a graph showing a relationship between the distance S and an electromagnetic noise. In FIG. 8, an ordinate represents a sound pressure level (dB) of the electromagnetic noise of the generator, and an abscissa represents the distance S. In FIG. 8, data at full load of 5,000 rpm are shown. As illustrated, when the distance S is substantially the half of the peripheral width H of the magnetic pole piece 8a or less, the electromagnetic noise is 78 dB or less, being a small value. However, when the distance S is larger than the half of the peripheral width H of the magnetic pole piece 8a, the chamfered portion 100 is reduced, whereby the electromagnetic noise is deteriorated from 78 dB to 82 dB. This is because, by making the distance S substantially the half of the peripheral width H of the magnetic pole piece 8a or less, the chamfered portion 100 is increased in the peripheral direction of the magnetic pole piece 8a, whereby an outer peripheral surface of the magnetic pole piece 8a becomes smooth. Therefore, a magnetic flux flowing from the magnetic pole piece 8a to a stator core 4 is smoothly interchanged, a waveform of a phase voltage becomes more like a typical sinusoidal wave, and the electromagnetic noise can be reduced.

Embodiment 4

Figure 9:
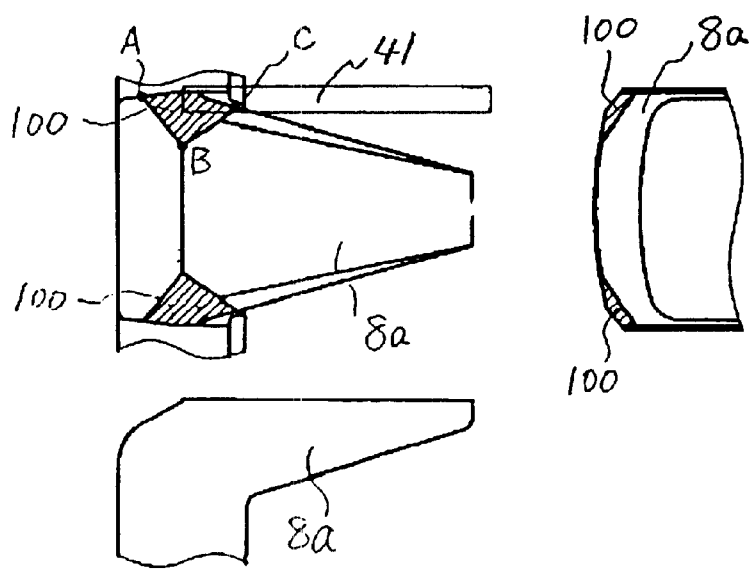
FIG. 9 illustrates a part of a magnetic pole piece of a rotor of an a.c. generator for vehicle according to Embodiment 4 of the present invention.
Figure 10A:
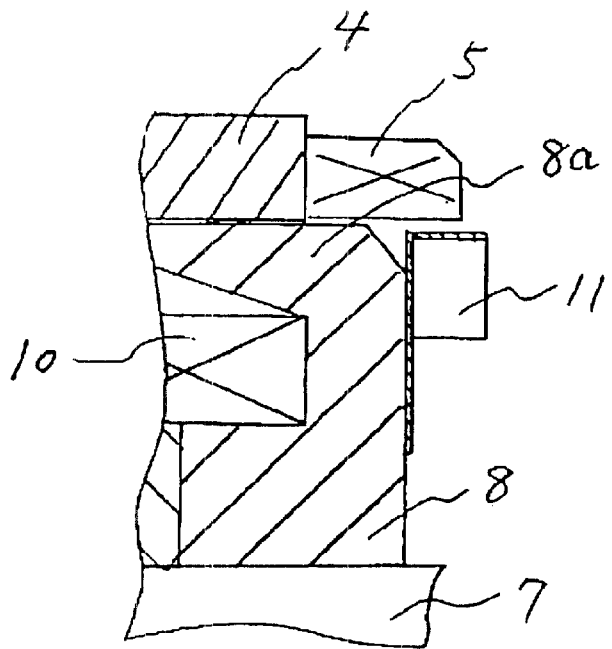
FIG. 10a is an enlarged cross-sectional view of a part of the a.c. generator for vehicle according to a conventional technique.
Figure 10B:
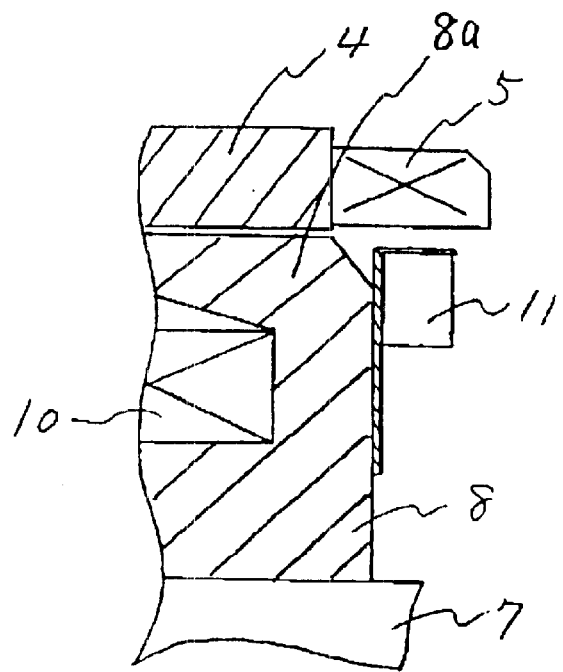
FIG. 10b is an enlarged cross-sectional view of a part of the a.c. generator for vehicle according to Embodiment 4 of the present invention.

FIG. 9 is an enlarged view of a part of a magnetic pole piece 8a of a rotor 6 of an a.c. generator for vehicle according to Embodiment 4 of the present invention. FIG. 10a is an enlarged cross-sectional view of a part of the conventional a.c. generator for vehicle. FIG. 10b is an enlarged cross-sectional view of a part of the a.c. generator for vehicle according to Embodiment 4 of the present invention. In Embodiment 4, as illustrated in FIG. 9, a starting point of a taper in a root shoulder portion of the magnetic pole piece 8a is substantially in agreement with an end surface of a stator core 4.

As illustrated in FIG. 10a, in the conventional a.c. generator for vehicle, the end surface of the stator core 4 is on an inner peripheral side from a starting point of the taper in the root shoulder portion of the magnetic pole piece 8a. However, in the conventional a.c. generator for vehicle, there is a problem that a pressure variation is generated when a cooling air, supplied by the fan 11, passes a portion where the stator coil 5 having an irregular surface excessively approaches the root shoulder portion of the magnetic pole piece 8a so as to generate a noise. However, as illustrated in FIG. 10b, by making the starting point of the taper in the root shoulder portion of the magnetic pole piece 8a substantially in agreement with the end surface of a stator core 4 in the radial direction, the stator coil 5 is arranged apart from the root shoulder portion of the magnetic pole piece 8a, whereby a pressure variation by a cooling air can be restricted, and a noise can be prevented.

Embodiment 5

It is preferable to form a chamfered portion 100 by a curved surface. Rotor cores 8 and 9 are ordinarily produced in use of a cool forging metallic die. When the chamfered portion 100 is formed by the curved surface a corresponding portion of the cool forging metallic die can be formed by a curved surface. In other words, when the chamfered portion 100 is flat, joining portions between surfaces corresponding to the chamfered portion 100 in the metallic die and the other surfaces of the metallic die become steep, whereby as the time of usage elapses, a crack is apt to occur in the joining portions by concentration of stress so as to deteriorate the metallic die. However, when the chamfered portion 100 is curved, the joining portions between the surfaces corresponding to the chamfered portions 100 of the metallic die and the other surfaces become smooth, whereby a crack caused by concentration of stress is hardly generated, and a lifetime of the metallic die can be extended.

Further, it is desirable to make a joining corner among the chamfered portion 100 and the other adjacent surfaces a rounded shape. In this case, an outer peripheral surface of the magnetic pole piece 8a becomes smooth so as to be able to suppress a wind noise caused by a cooling air passing through the joining corner.

Embodiment 6

The number of slots of a stator core 4 is preferably two by each pole and each phase. This means that the width of teeth 41 of the stator core 4 becomes narrow, whereby it is possible to reduce an unnecessary overlap with magnetic pole piece 8a and to reduce a magnetic flux leaking through the teeth 41.

Further, it is preferable to change widths of adjacent teeth 41 of the stator core 4. In other words, by changing the widths of the adjacent teeth 41, it is possible to disperse a wind noise of a degree component order corresponding to the number of slots, which wind noise is generated between the rotor 6 and a coil end of a stator 3 or between the rotor 6 and an inner peripheral surface of the stator core 4, by winding a stator coil 5 at variable pitch, whereby the wind noise can be reduced.

Embodiment 7

Figure 11:
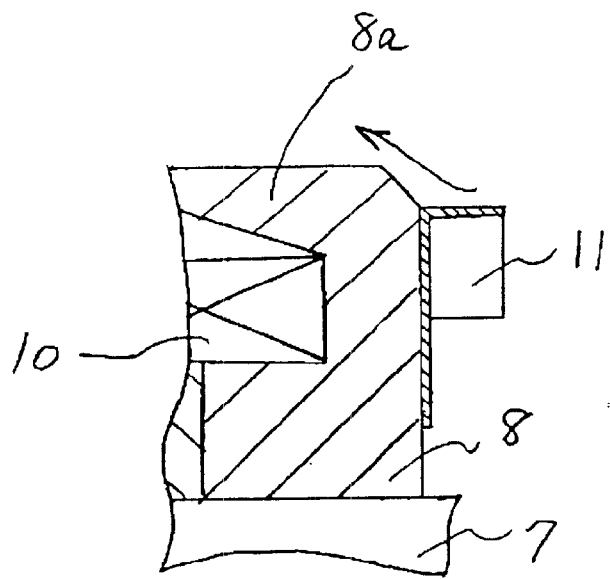
FIG. 11 is an enlarged cross-sectional view of a part of the a.c. generator for vehicle according to Embodiment 7 of the present invention.

An annular fan 11 is located on at least one of back surfaces of a first rotor core 8 and a second rotor core 9. An outer diameter of the fan 11 is preferably smaller than that of the first rotor core 8 or the second rotor core 9. As illustrated in FIG. 11, a cooling air smoothly flows in an axial direction like an arrow to suppress wind noise. When the outer diameter of the fan 11 is smaller than the outer diameters of the rotor cores 8 and 9, a predetermined effect is obtainable. As illustrated in the figure, when a starting point of a shoulder taper on an end surface of the rotor core 8 is on an upper surface of the fan 11, the effect becomes outstanding.

Embodiment 8

Figure 12:
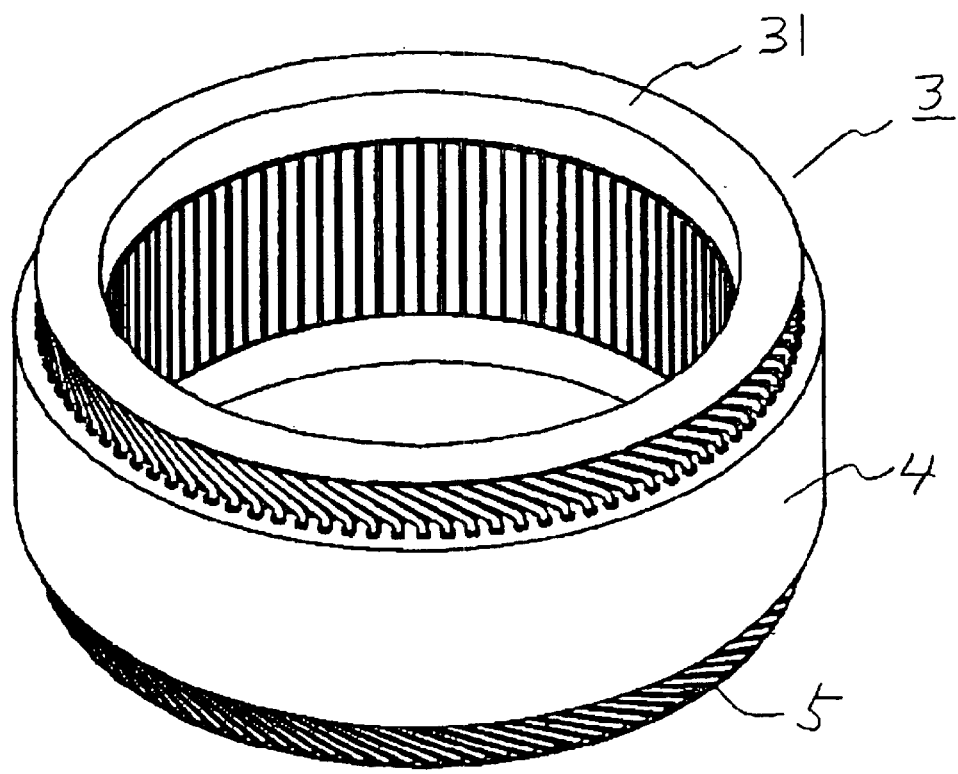
FIG. 12 is a perspective view of a stator of an a.c. generator for vehicle according to Embodiment 8 of the present invention.

FIG. 12 is a perspective view illustrating a stator of an a.c. generator for vehicle according to Embodiment 8 of the present invention. In FIG. 12, numerical reference 31 designates a shielding plate for shielding a coil end of a stator coil 5. The shielding plate 31 makes a surface of the coil end flat, whereby an effect of suppressing a wind noise caused by a cooling air passing through the coil end is obtainable. In the figure, the shielding plate 31 shields an inner peripheral surface and an upper surface of the coil end. However, by shielding at least the inner peripheral surface, a predetermined effect is obtainable.

Embodiment 9

Figure 13:
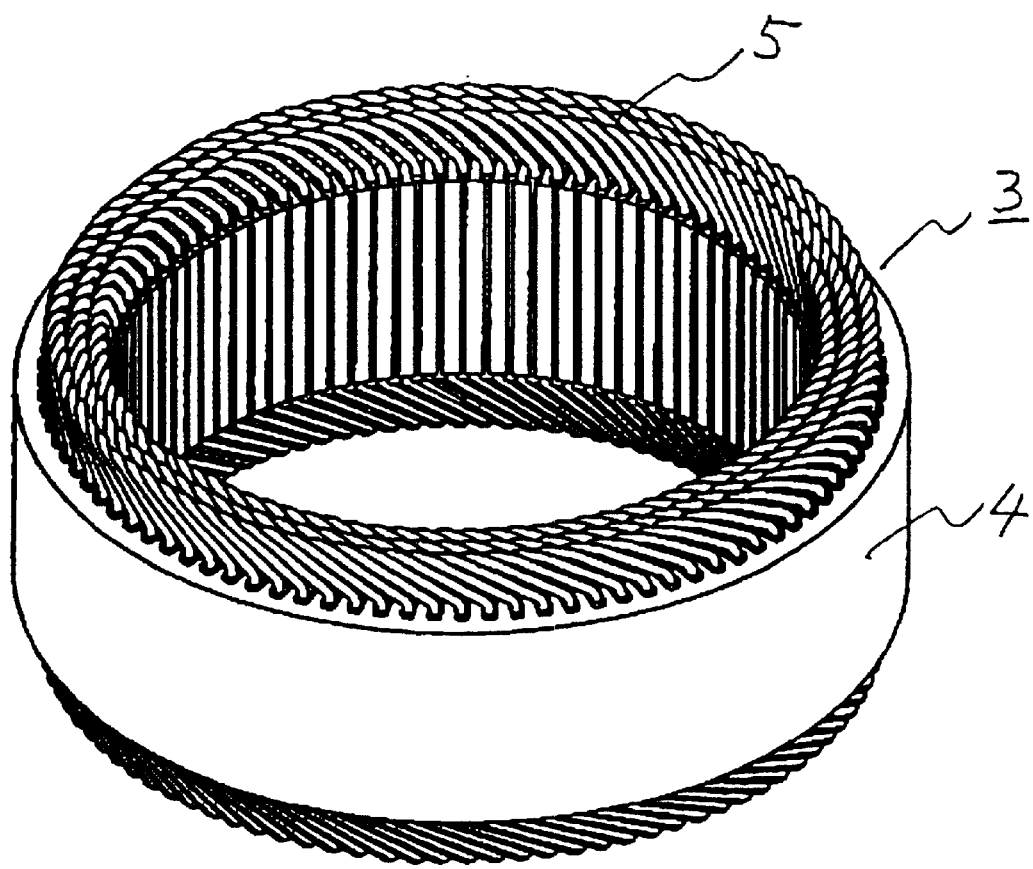
FIG. 13 is a perspective view of a stator of an a.c. generator for vehicle according to Embodiment 9 of the present invention.
Figure 14:
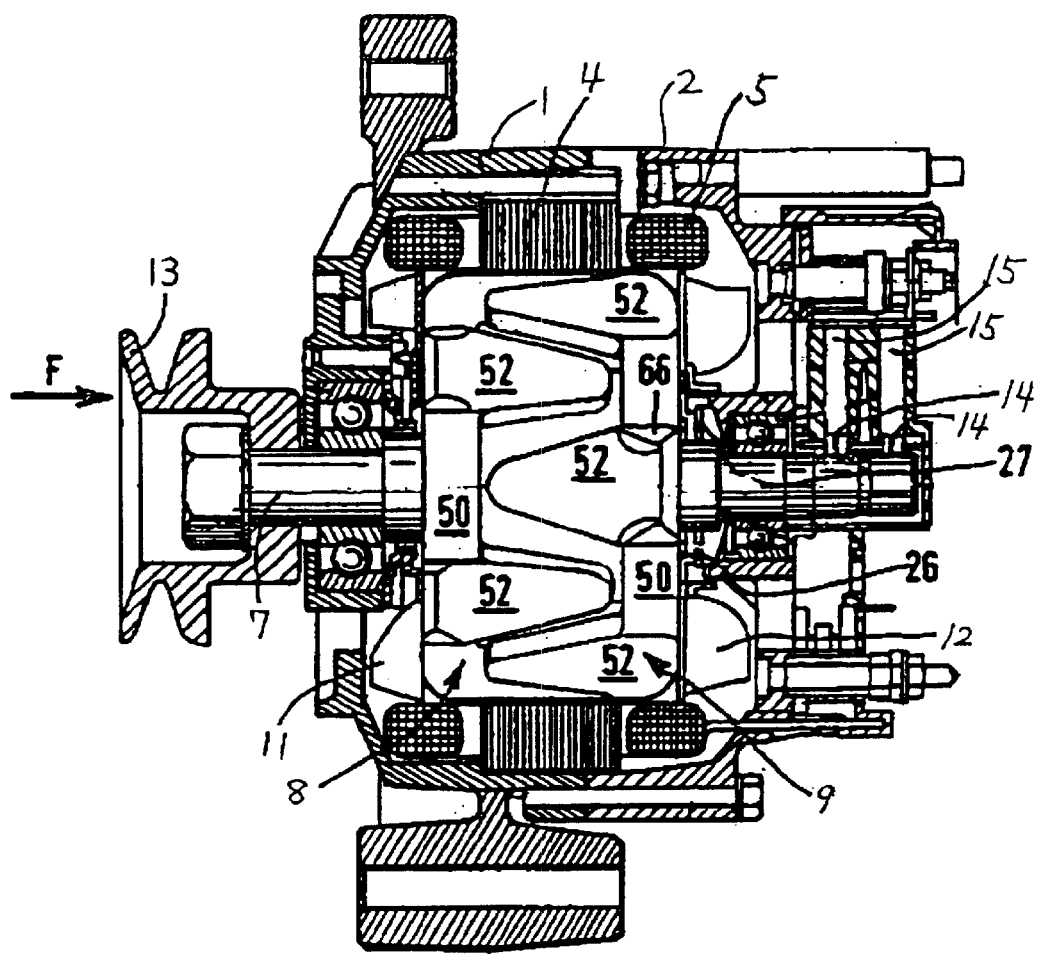
FIG. 14 is a cross-sectional view of a conventional a.c. generator for vehicle.
Figure 15:
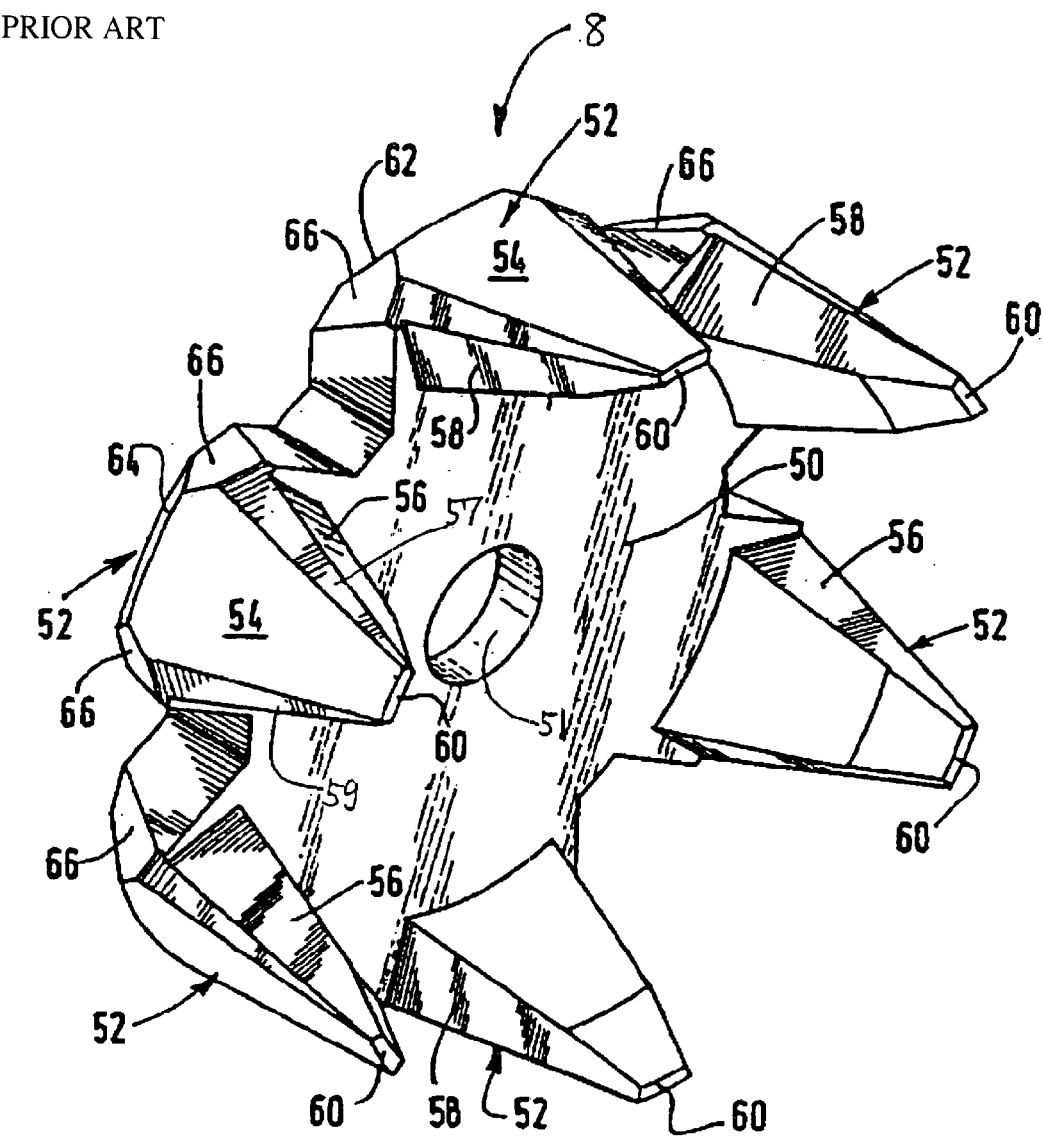
FIG. 15 is a perspective view of a magnetic pole wheel of a rotor of the conventional a.c. generator for vehicle.
Figure 16:
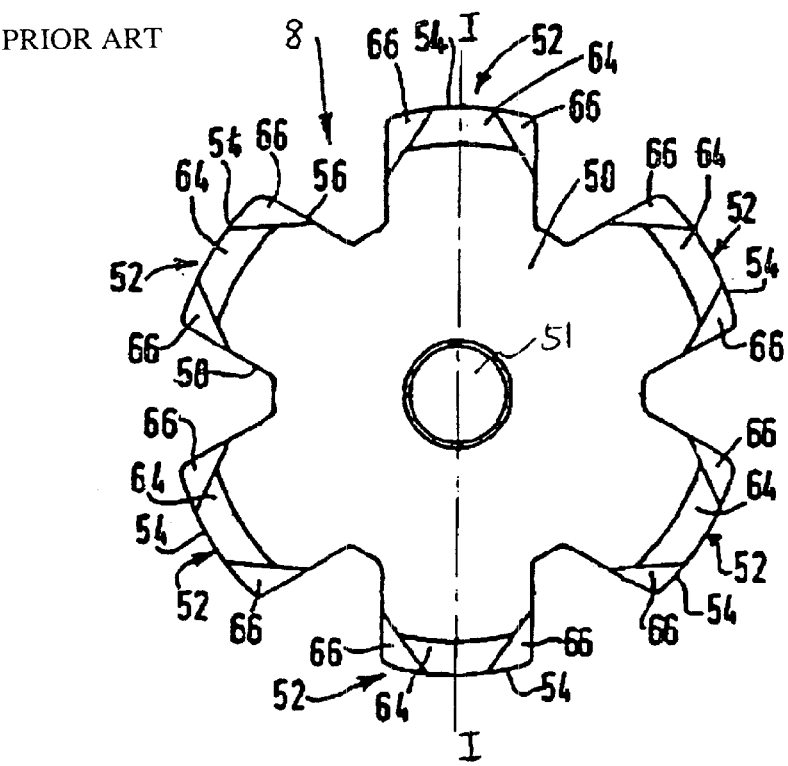
FIG. 16 is a front view of the magnetic pole wheel of the rotor of the conventional a.c. generator for vehicle.
Figure 17:
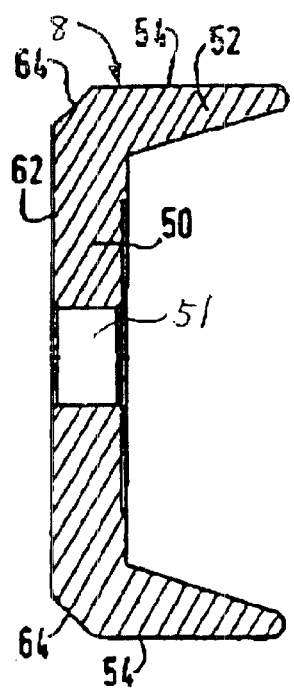
FIG. 17 is a cross-sectional view of the magnetic pole wheel of the rotor of the conventional a.c. generator for vehicle.
Figure 18:
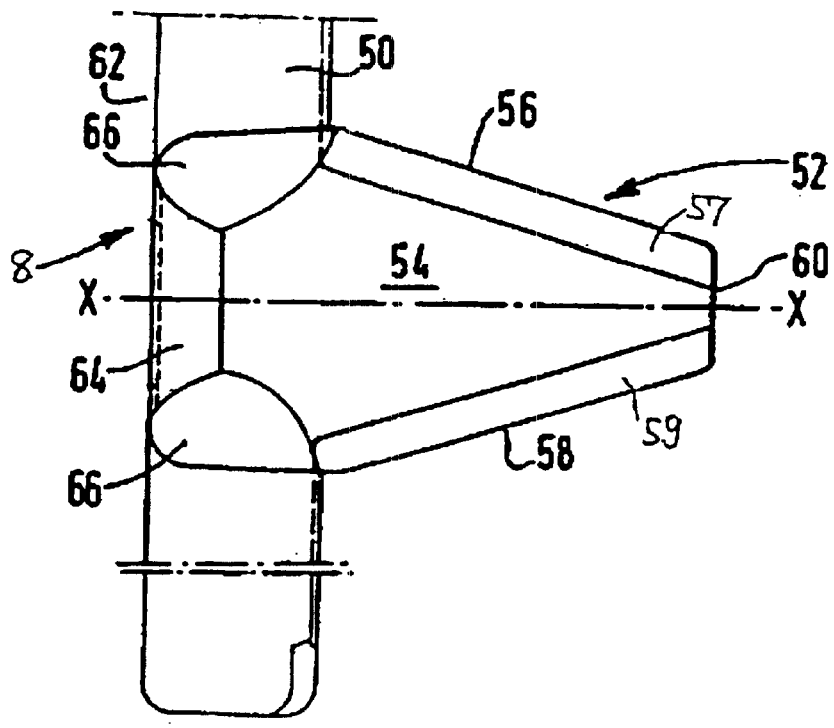
FIG. 18 is an enlarged view of a part of a magnetic pole piece of the rotor of the conventional a.c. generator for vehicle.
Figure 19:
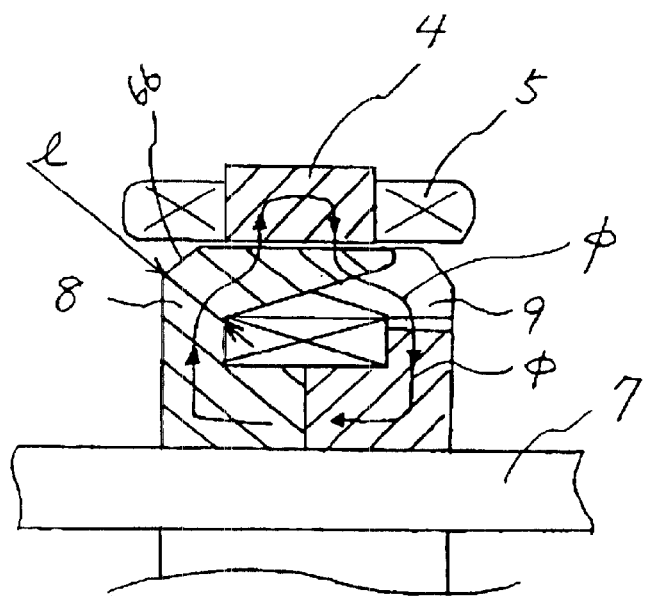
FIG. 19 is a cross-sectional view of the rotor and a stator of the conventional a.c. generator for vehicle explaining a flow of a magnetic flux.

FIG. 13 is a perspective view illustrating a stator of an a.c. generator for vehicle according to Embodiment 9 of the present invention. It is preferable to combine rotor cores 8 and 9 both having a chamfered portion 100 according to the present invention and a stator 3 illustrated in FIG. 13. As illustrated in the figure, by forming a coil end so that a stator coil 5, outwardly extending from an end surface of a stator core 4, is aligned in peripheral directions, a cooling air is controlled, and an effect of further suppressing the wind noise is obtainable.

The first advantage of the a.c. generator for vehicle according to the present invention is that a wind noise can be suppressed, the magnetic circuit of the rotor is improved, and an output becomes high.

The second advantage of the a.c. generator for vehicle according to the present invention is that a leaking magnetic flux can be reduced.

The third advantage of the a.c. generator for vehicle according to the present invention is that an electromagnet noise can be suppressed.

The fourth advantage of the a.c. generator for vehicle according to the present invention is that a leaking magnetic flux can be reduced, and an output is improved.

The fifth advantage of the a.c. generator for vehicle according to the present invention is that a lifetime of a cool forging metallic die can be elongated.

The sixth advantage of the a.c. generator for vehicle according to the present invention is that a wind noise can be suppressed.

Obviously, numerous modifications and variations of the present invention are possible in light of the above teachings. It is therefore to be understood that within the scope of the appended claims, the invention may be practiced otherwise than as specifically described herein.

The entire disclosure of Japanese Patent Application No. 2001-160715 filed on May 29, 2001 including specification, claims, drawings and summary are incorporated herein by reference in its entirety.

What is claimed is:

1. An a.c. generator for vehicle comprising:

a stator core having a stator coil;

a first rotor core, fixed to a rotational shaft inside an inner diameter of the stator core;

a second rotor core, fixed to the rotational shaft inside the inner diameter of the stator core;

a field magnetic coil for magnetizing the first rotor core and the second rotor core; and a plurality of first magnetic pole pieces and a plurality of second magnetic pole pieces, which respectively protrudes from the first rotor core and the second rotor core in an axis direction of the rotational shaft so as to mutually engage with a predetermined gap and to be opposite to the inner diameter of the stator core with a predetermined gap, wherein at least the first magnetic pole pieces or the second magnetic pole pieces has chamfered portions, formed by a surface on three points, being a point on a most outer periphery of a root shoulder portion and on a taper continuing from the most outer periphery toward an outer side of the generator in the axis direction to an end surface of the stator core, a point on a skew slanted portion of the magnetic pole piece, and a point on a surface of the magnetic pole piece apart from the end surface of the stator core by a distance between L1/4 and 7×L1/8 in the axis direction, where L1 is a distance between a root end surface of the magnetic pole piece and the end surface of the stator core.

2. The a.c. generator for vehicle according to claim 1, wherein the chamfered portions are formed on both of the first and second magnetic pole pieces.

3. The a.c. generator for vehicle according to claim 1, wherein the chamfered portions are formed on the peripheral end surfaces on both sides of the root shoulder portion.

4. The a.c. generator for vehicle according to claim 2, wherein the chamfered portions are formed on the peripheral end surfaces on both sides of the root shoulder portion.

5. The a.c. generator for vehicle according to claim 1, wherein the point on the skew slanted portion of the magnetic pole piece is positioned where tip ends of teeth of the stator core are overlapped in radial directions.

6. The a.c. generator for vehicle according to claim 2, wherein the point on the skew slanted portion of the magnetic pole piece is positioned where tip ends of teeth of the stator core are overlapped in radial directions.

7. The a.c. generator for vehicle according to claim 1, wherein the distance between the end surface of the stator core and the point on the skew slanted portion of the magnetic pole piece is a distance between the end surface of the stator core and a cross point between the tip end of the teeth of the stator core and the skew slanted portion of the magnetic pole piece or less.

8. The a.c. generator for vehicle according to claim 2, wherein the distance between the end surface of the stator core and the point on the skew slanted portion of the magnetic pole piece is a distance between the end surface of the stator core and a cross point between the tip end of the teeth of the stator core and the skew slanted portion of the magnetic pole piece or less.

9. The a.c. generator for vehicle according to claim 1, wherein a distance between two of the points on the taper of the root shoulder portions and also on two of the chamfered portions is a half of a width of the magnetic pole piece in the peripheral directions or less.

10. The a.c. generator for vehicle according to claim 2, wherein a distance between two of the points on the taper of the root shoulder portions and also on two of the chamfered portions is a half of a width of the magnetic pole piece in the peripheral directions or less.

11. The a.c. generator for vehicle according to claim 1, wherein the number of the slots of the stator core is two by each pole and each phase.

12. The a.c. generator for vehicle according to claim 2, wherein the number of the slots of the stator core is two by each pole and each phase.

13. The a.c. generator for vehicle according to claim 1, wherein the chamfered portions are formed by a curved surface.

14. The a.c. generator for vehicle according to claim 1, wherein the chamfered portions and surfaces adjacent thereto are joined so as to form a rounded shape.

15. The a.c. generator for vehicle according to claim 1, wherein a starting point of the taper in the root shoulder portion of the magnetic pole piece is substantially aligned in the axial direction with the end surface of the stator core.

16. The a.c. generator for vehicle according to claim 1, wherein widths of adjacent teeth of the stator core are different each other.

17. The a.c. generator for vehicle according to claim 1, wherein an annular fan is located on at least one of end surfaces of the first rotor core and the second rotor core, and an outer diameter of the fan is smaller than that of the first rotor core or the second rotor core.

18. The a.c. generator for vehicle according to claim 1, wherein the stator coil has a coil end outwardly extending from the end surface of the stator core, and a shielding plate is located thereto to shield at least an inner peripheral surface of the coil end.

19. The a.c. generator for vehicle according to claim 1, wherein the stator coil has a coil end outwardly extending from the end surface of the stator core, and the coil end is arranged by aligning the stator coil in peripheral directions.

* * * * *